US009313549B1

(12) United States Patent
Nusbaum (10) Patent No.: US 9,313,549 B1
(45) Date of Patent: Apr. 12, 2016

(54) SYSTEM AND METHOD FOR TARGETING AND REWARDING A VIDEO PROMOTER AND A VIEWER RELATED TO SOCIAL MEDIA ADVERTISING

(71) Applicant: Michael Jay Nusbaum, Far Hills, NJ (US)

(72) Inventor: Michael Jay Nusbaum, Far Hills, NJ (US)

( * ) Notice: Subject to any disclaimer, the term of this patent is extended or adjusted under 35 U.S.C. 154(b) by 3 days.

(21) Appl. No.: 14/013,612

(22) Filed: Aug. 29, 2013

(51) Int. Cl.
*H04N 7/16* (2011.01)
*H04N 21/4784* (2011.01)

(52) U.S. Cl.
CPC ................. *H04N 21/4784* (2013.01)

(58) Field of Classification Search
CPC .................................................. H04N 21/4784
USPC .................................................................. 725/23
See application file for complete search history.

(56) References Cited

U.S. PATENT DOCUMENTS

| 7,630,935 | B2 * | 12/2009 | Loeger et al. .................... 705/39 |
| 2009/0300670 | A1 * | 12/2009 | Barish .................... G06Q 30/02 725/13 |
| 2011/0218845 | A1 * | 9/2011 | Medina ............... G06Q 30/0208 705/14.11 |
| 2011/0231868 | A1 * | 9/2011 | Martens .................. G06Q 30/02 725/13 |
| 2012/0136703 | A1 * | 5/2012 | Stewart ....................... 705/14.16 |
| 2012/0272278 | A1 * | 10/2012 | Bedi .............................. 725/105 |
| 2012/0284138 | A1 * | 11/2012 | Shave ................ G06Q 30/0207 705/26.3 |
| 2013/0019259 | A1 * | 1/2013 | Pizzurro et al. .................. 725/23 |
| 2013/0212611 | A1 * | 8/2013 | Van Aacken et al. ........... 725/23 |
| 2013/0318180 | A1 * | 11/2013 | Amin .................... H04L 65/403 709/206 |

* cited by examiner

*Primary Examiner* — Farzana Hossain
(74) *Attorney, Agent, or Firm* — Lowenstein Sandler LLP (57) ABSTRACT

A system and method for determining a promoter's and a viewer's remuneration for promoting and watching a video, including identifying a promoter based on an indication of a match between a profile associated with a video and a profile associated with the promoter, sending, to a viewer associated with the promoter, an invitation to view the video, receiving a message indicating that the viewer associated with the promoter has viewed the video, receiving a message indicating that the viewer associated with the promoter has answered a question regarding the video, crediting the account of the viewer associated with the promoter who viewed the video, based on the message indicating that the at least one viewer associated with the promoter has viewed the video, and crediting the account of the promoter based on the message indicating that the at least one viewer has viewed the video.

19 Claims, 3 Drawing Sheets

SYSTEM AND METHOD FOR TARGETING AND REWARDING A VIDEO PROMOTER AND A VIEWER RELATED TO SOCIAL MEDIA ADVERTISING

TECHNICAL FIELD

The present disclosure relates generally to targeting and rewarding a video promoter and a viewer related to social media advertising, and more particularly to a system and method for determining a promoter's and a viewer's remuneration for promoting and watching a video.

BACKGROUND

Social media is a platform that is accessible via internet access. Social media marketing programs often create content, such as a marketing video, which encourages a viewer to share it with other members within his or her social networks. A video can spread from viewer to viewer and presumably resonates with each viewer because it appears to come from a trusted, third-party source as opposed to the brand or company itself. Hence, social media advertising can include a form of marketing that is driven by word-of-mouth, meaning it results in earned media rather than paid media. Such communication can foster brand awareness for the product or organization that is represented in the video. Additionally, social media can be an effective platform for organizations to implement marketing campaigns.

The sharing of video content has achieved worldwide popularity, supported by video hosting sites or video sharing sites, such as such as YouTube™ or Vimeo™. Many videos have become extremely popular through the process of Internet sharing. Typically, a video is a short clip on a video sharing site. The video may be promulgated to viewers through video sharing websites, social media, and email. Examples of popular videos include the video by Invisible Children, Inc. named Kony 2012, which, according to "YouTube™ Video Statistics," achieved over 34,000,000 views on the first day of its upload on 5 Mar., 2012. Another example is the music video Gangnam Style" by the musician Psy, which as of May 1, 2013, has been viewed over 1.59 billion times YouTube™.

People who post videos that become popular can earn money. The video sharing websites are often monetized by selling and showing advertising associated with the video. The video sharing websites often offer the original poster of the video a profit sharing contract. However, the people who facilitate the promotion of the video by encouraging others to watch the video, or the viewers who watch the video are often not rewarded monetarily.

Thus, there is a need for a system and method configured to overcome the deficiencies of the conventional manner for targeting and rewarding a video promoter and a viewer related to social media advertising, and for determining the promoter's and the viewer's remuneration for promoting and watching a video.

BRIEF DESCRIPTION OF THE DRAWINGS

The present disclosure will be more readily understood from the detailed description of exemplary embodiments presented below, considered in conjunction with the attached drawings, of which.

It is to be understood that the attached drawings are for purposes of illustrating the concepts of the disclosure.

DETAILED DESCRIPTION

Embodiments of the present disclosure are directed to a system and method for targeting and rewarding a video promoter and a viewer related to social media advertising and for determining the promoter's and the viewer's remuneration for promoting and watching a video.

In an embodiment, a social media reward system may identify a promoter of a video based on an indication of a match between a profile associated with a video and a profile associated with the promoter. The social media reward system may send an invitation to view the video to a viewer associated with the promoter, wherein the invitation comprises a unique identifier configured to credit an account of the promoter and to credit an account of the viewer associated with the promoter when the viewer associated with the promoter has viewed the video. In an embodiment, the invitation may include a hyperlink of the video or a thumbnail icon of the video. The social media reward system may receive a message indicating that the viewer associated with the promoter has viewed the video and that the viewer associated with the promoter has answered a question or series of questions regarding the video. The social media reward system may credit the account of the viewer associated with the promoter who viewed the video, and credit the account of the promoter based on the message indicating that the at least one viewer associated with the promoter has viewed the video. Thus, the payment to air a commercial advertisement can now go directly to the consumer instead of the station or company airing the commercial.

Figure 1:
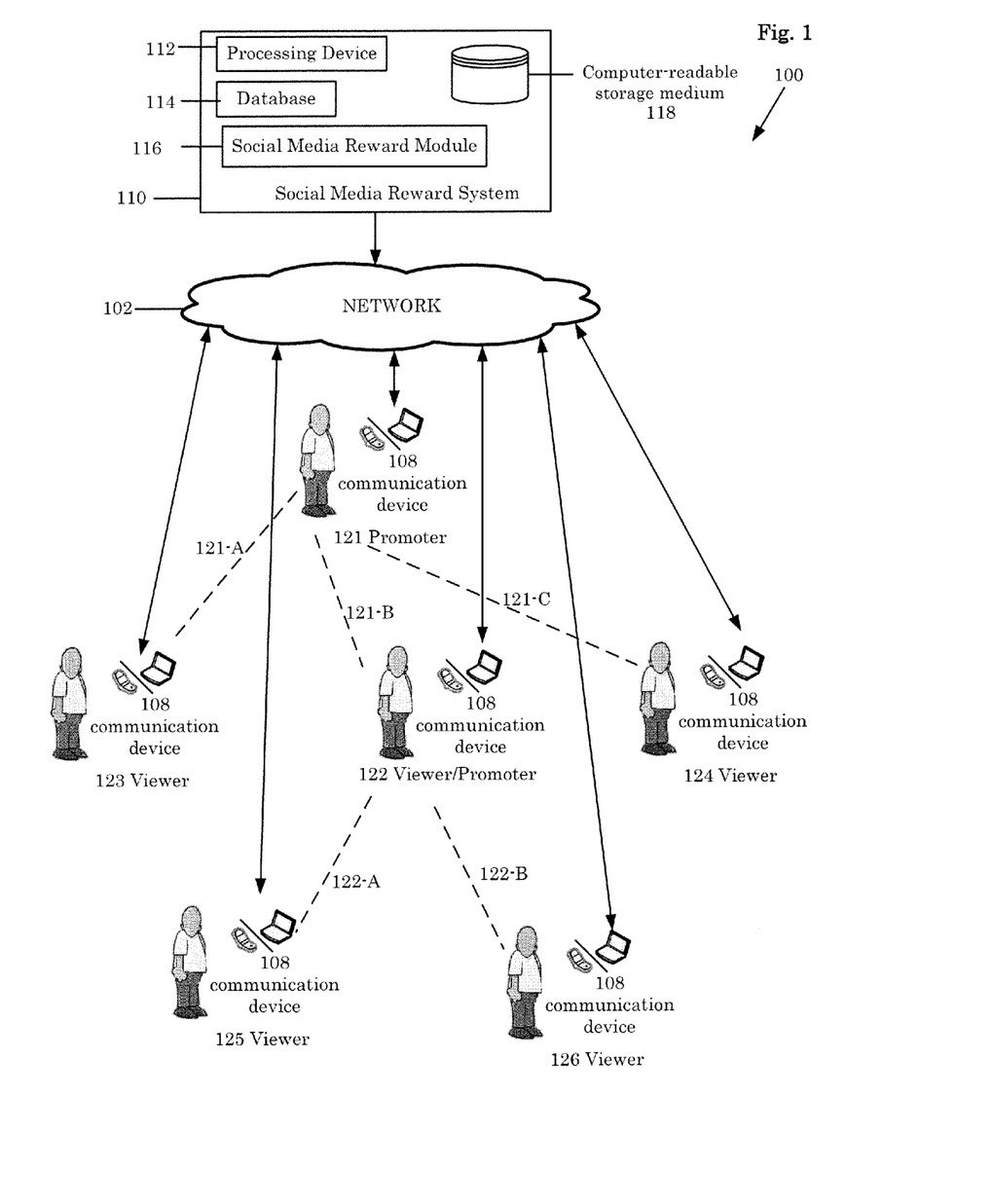
FIG. 1 is a block diagram of a system for targeting and rewarding a video promoter and a viewer related to social media advertising and for determining the promoter's and the viewer's remuneration for promoting and watching a video.

FIG. 1 illustrates a block diagram of an exemplary environment including a system configured to target and reward a video promoter 121 and viewers 122-126 (hereinafter collectively referred to as a "viewer" or "viewers") related to social media advertising and to determine the promoter's and the viewer's remuneration for promoting and watching a video, herein referred to as a social media reward system 110 (also referred to as the "system 110"). As used herein, the term "video" is intended to include, but is not limited to, a recording produced with a video recorder (e.g., camcorder) or some other device that captures full motion and optionally, an audio portion. The video can be a short clip or a longer video on a video sharing site. In an embodiment, the video can be a commercial video or a promotional video. As used herein, the term "video promoter" is intended to include, but is not limited to, a person who, in exchange for a fee, urges friends, followers, contacts, and associates to watch a video and to encourage their friends, contacts, and associates to watch the video. As used herein, the term "viewer" is intended to include, but is not limited to, a person who watches a video.

The system 110 includes a processing device 112 (such as a server) and a communication documentation module (also referred to as the "processing logic 116") configured to target and reward a video promoter 121 and a viewer related to social media advertising and to determine the promoter's and the viewer's remuneration for promoting and watching a video, in accordance with an embodiment of the present disclosure. As used herein, the term "processing device" is intended to include a programmable electronic machine that performs and/or executes software to perform several operations such as assemble, store, correlate, or otherwise process information.

The system 110 may also include a computer-readable medium 118 for storing the database 114 and a wireless device and/or an Internet interface (not shown) that allows for communications with any type of communication device. The system 110 may be configured to communicatively connect to one or more communication devices 108 operated by and associated with the video promoter 121 or with a viewer.

The system 110 may also include a database 114. As used herein, the term "database" refers to a repository for containing and storing data. The data that is stored in the database 114 may be related to the information related to targeting and rewarding a video promoter and a viewer related to social media advertising and for determining the promoter's and the viewer's remuneration for promoting and watching a video.

Figure 2:
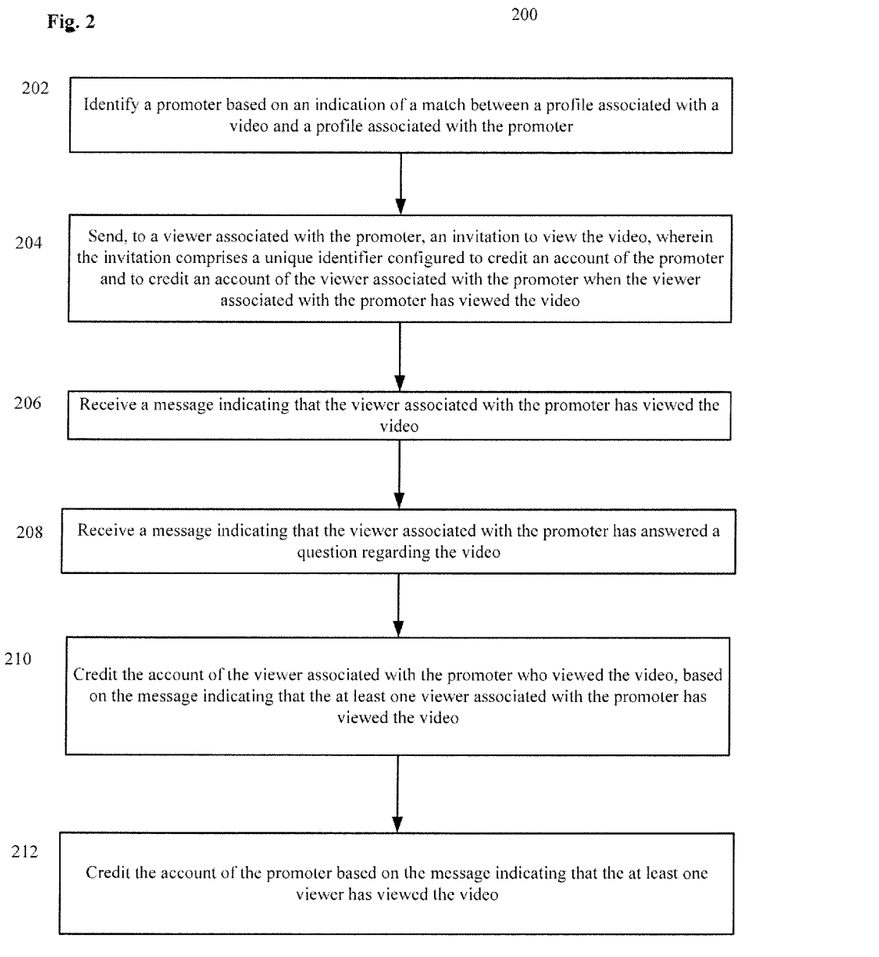
FIG. 2 is a flow diagram of a method for targeting and rewarding a video promoter and a viewer related to social media advertising and for determining the promoter's and the viewer's remuneration for promoting and watching a video.

According to embodiments, the processing logic 116 may include one or more computer programs, executable by a processing device (e.g., the processing device 112 of the system 110), including one or more sets of instructions provided to implement the method 200 as described below. In an embodiment, the processing logic 116 may be implemented by a computing device or processing device 112 configured to target and reward a video promoter 121 and a viewer related to social media advertising and to determine the promoter's and the viewer's remuneration for promoting and for watching a video.

In an embodiment, a network 102 may be any type of communications medium that allows for communications between the social media reward system 110 and the communications devices that are associated with the video promoter 121 and the viewer. The network 102 may be, for example, a private network (e.g., a local area network (LAN), a wide area network (WAN), intranet, etc.), a corporate network (e.g., a private network for an organization such as a corporation), and/or a public network (e.g., the Internet). For example, the video promoter 121 and the viewer may communicate with the system 110 via the network 102 and the one or more communication devices 108.

The communication device 108 may be any device capable of communicating with the system 110 via the network 102 including, but not limited to, a computer, a smart phone, a wireless device, a tablet, and/or any suitable computing device. In an embodiment, the communication device 108 may be a mobile device (e.g., a handheld device, smart phone or web portal device) that communicates with the network 102 via a wireless connection. In an embodiment, the system 110 may determine and verify an electronic address, (e.g., email address, IP address, etc.) that is in connection with the communication devices 108 associated with the video promoter 121 and a viewer. In an embodiment, the system 110 may include an application ("app") that can reside on a communication device 108 in which a customer or user can place their profile so that companies can target and pay them to view specific commercials or promotions, and in which a user can select promotional videos, watch them, rate them, get paid to do so and get paid to promote the videos or commercials to their friends and have their friends watch them, rate them and get paid as well. The app can permits users to enter such things as: their profile, bid on promotions, view and rate promotional videos, build their promotional network, promote to their network, etc. as discussed below.

In an embodiment, a person, a company, an entity, etc. can create a promotional video and upload the promotional video to a video hosting site or a video sharing site. As used herein, the term "video hosting site" or a "video sharing site" is intended to include, but is not limited to, a website where a video clip can be uploaded to and/or stored for distribution or for viewing. The system 110 can associate a profile with the video and can target a specific audience in view of the profile associated with the video. In an embodiment, the profile associated the video can include at least one of a subject matter of the video, a genre of music performed in the video, a celebrity in the video, an target age group of the video, a target gender of the video, a target geographic location of the video, a medication featured in the video, a product featured in the video, or a hobby or activity of a viewer, a political affiliation of the viewer, or the like. For example, a video that promotes a medication for the treatment of acne can have a profile that can target the video towards teenagers and/or other demographic groups that are likely to have issues with acne. In another example, a video that promotes a luxury automobile can have a profile that can target the video towards an older generation and/or the other demographic groups that are likely to prefer luxury cars. In an embodiment, the system 110 can store the profile that is associated with the video. Therefore, the system 110 can target specific audiences through the selection of criterion stored by the customer in the customer's own profile.

In an embodiment, the system 110 can receive and store a profile that is associated with a promoter 121 or a viewer so that the promoter 121 or viewer can establish preferences for certain types of videos that he or she would like to get paid to promote or view. In an embodiment, the system 110 can receive an account registration request from the promoter 121 or viewer to establish an account to include additional unique identification about the promoter 121 or viewer.

The account may include profile information of the promoter 121 or viewer, such as a username and password so that the promoter 121 or viewer can log in to provide additional specific information about himself or herself. The additional profile information can include unique identifiers in connection with the promoter 121 or viewer, such as the telephone number, a cell phone number, an IP address, or an email address, etc. that is associated with the promoter 121 or viewer. Other unique identifiers can include the name, address, age, date of birth, gender, eye color, hair color, social security number, a security code, a geographic location, a music preference, a movie preference, a product preference, a medication taken, or a hobby or activity, etc. associated with the promoter 121 or viewer. The profile information of the promoter 121 or viewer may be stored in the database 114.

In an embodiment, the system can present the promoter 121 or viewer with a series of questions to further establish his or her preferences. Examples of such additional questions can include, but are not limited to: birthday; music preferences; movie preferences; product questions; do you use: hair spray, makeup, birth control, blood pressure pills, diabetes medications, etc.; own a car; own a home; rent an apartment; still in school; etc. In an embodiment, the system 110 can have the ability to add questions to the promoter 121 or viewer. As more questions are presented and answered, the system 110 can be better enabled to match the audience to the requested target audience by the company posting the video. In an embodiment, the system 110 can determine the size of target audience based on the respective profiles of the viewers. For instance, if the profile of the video is such that it matches the preferences of a relatively small number of viewer profiles, then the system 110 can determine that a lower target audience size than if the profile of the video is such that it matches the preferences of a relatively large number of viewer profiles.

In an embodiment, the system 110 can request the promoter 121 or viewer to enter his or her address and social security number so that he or she can get paid for promoting or watching a video. The system 110 can also enable the promoter 121 or the viewer to create a network of friends and social contacts and also link to existing social networks to recommend a video to. In an embodiment, if the promoter 121 or viewer recommends the video to a friend (e.g., viewers 122, 123, and 124, as indicated by the respective dashed lines 121-A, 121-B, and 121-C of FIG. 1) and if the friend watches the video and answers the questions, then the promoter 121 can get paid for promoting the video and the friend can also get paid for watching the video. For example, the users whom the promoter recruited to view the promotion can be referred to as "first tier users".

In an embodiment, if the friend also promotes the video to a person in his or her network of friends or contacts, and if the person views the video, then the promoter 121, the friend who promoted the video, and the person who viewed the video can all get paid. The viewers whom the first tier users recruited to view the promotion can be referred to as the "second tier users". The users whom the second tier users recruit can be referred to as the "third tier users" and so forth until the number targeted in the campaign are reached. For example, if a promoter gets 500 people to view and rate a video, and each of the first tier users gets 500 people (e.g., second tier users) to view and rate the video, the promoter can get paid for the first 500 and for each of the 500 of the views that each of the second tier users got as well until the target selected by the posting company is reached. Each next tier user can also receive a fraction of a percent for each view and rating by views of those whom they recruited.

In an embodiment, if the views of the video go beyond the target number, then the system 110 can prevent further payment for such views. In other words, the users could still view them and rate them but not get paid to do so. In an embodiment, the system 110 can send a message to the company indicating that the target number of views has been reached (or is approaching) and can enable the company to increase the viewership number and continue to pay for additional views by increasing their budget.

In an embodiment, the system 110 can be configured to display a unique home screen on each communication devices 108 associated with the video promoter 121 and the viewer. In an embodiment, the unique home screen display can be configured by an application that resides on the communication device 108 that is associated with the promoter 121 or viewer. In another embodiment, the unique home screen display can be configured by an application that resides on the system 110 or on a third party server (not shown in FIG. 1) that can be accessible by the communication device 108 that is associated with the promoter 121 or viewer via the network 102.

Each unique home screen display can be configured in view of the profile information of the promoter 121 or viewer. Each unique home screen display can be also be configured in view of the profile information associated with each video. For example, the top of the home screen display can have some rows of video thumbnails. As used herein, the term "video thumbnail" is intended to include, but is not limited to, a reduced-size version of a picture that represents the video, which can be used to help in recognizing and organizing the video on the home screen display. In an embodiment, the first row can include videos recommended by the system 110, based on, for example, the highest ratings of the videos, while the second row can include thumbnails of videos that have been recommended by friends in the video promoter's 121 or the viewer's network.

In an embodiment, a video that has been uploaded to a video hosting site or a video sharing site can be associated with a promotional budget. The budget can be divided among the promoter 121 who promotes the video and the viewer who views and rates the video. For example, a certain percentage of the budget can be allocated to a promoter 121 while the remaining percentage can be allocated to the viewers (for example, up to a predefined maximum number of viewers). The system can calculate a payment to the viewer 121 in view of the promotional budget allocation and the maximum number of viewers that will be paid for watching the video. The results of the calculation can be included in the profile of the video. In an embodiment, the system 110 can sort the videos based on the highest amounts that will be paid to the viewers for watching the video. In an embodiment, the system 110 can be configured to display, for example, on the first row of the home screen, the videos that are associated with the largest payment to the viewer for watching and rating the video.

In an embodiment, the home screen display can include a selector, such as a cursor or an indicator used to show the position on the home screen display that will respond to input such as a click or a touch on a touch-screen communication device 108. The selector can select a thumbnail of a video. The viewer can view a video by moving the selector over the thumbnail of the video and by clicking or touching the selected thumbnail, which can initiate the video to begin to play on the communication device 108 associated with the or viewer. At the end of the video, the system 110 can present a series of questions to the communication device 108 associated with the viewer to answer.

The questions can ask for a rating of the video and/or ask whether the video was influential to the viewer or any number of questions related to the user based on the content of the video. In an embodiment, the person or company that posted the video can change or add questions. In an embodiment, the system 110 can impose a limit to the number of questions that are asked so as not to overburden the viewer with having to answer too many questions. The system can also impose an additional fee to the person or company that posted the video for asking additional questions. In an embodiment, the system 110 can receive a message from the communication device 108 associated with the viewer indicating that the viewer has viewed the video and/or has completed answering the questions about the video. The system 110 can then credit an account associated with the viewer with a credit, such as a monetary reward or a certain amount of points that can be converted into cash or prizes based on receiving the message indicating that the viewer has viewed the video. In an embodiment, the system 110 can tabulate or compile the answers from several of or all of the viewers who have viewed the video, generate a result of the tabulation of the answers, and send the results to a communication device associated with the person, company, owner, or entity that created and/or uploaded the promotional video.

In an embodiment, the system 110 can send a message to the communication device 108 associated with the viewer to ask the viewer if he or she would like to promote the video to friends, contacts, and/or associates. The system 110 can also send a message indicating that a promoter 121 can earn money or rewards when the friends, contacts and/or associates to whom the video was referred to watch the video. If the viewer would like to become a promoter 121 of the video, the system 110 can be configured to display a network section, for example, on the home screen, a list of friends, contacts, and/or associates of the viewer. The promoter can build their network by linking the app to existing social media networks such as Facebook. The system can receive a message from the communication device 108 associated with the viewer that the viewer wishes to invite other people in his or her network (e.g., viewer 125 and viewer 126, as indicated by the respective dashed lines 122-A and 122-B of FIG. 1) to view the video. Since the viewer is promoting the video, the viewer also becomes a promoter (e.g., viewer/promoter 122 of FIG. 1).

In an embodiment, the system 110 can send a message to the communication devices 108 associated with the viewer 125 and/or the viewer 126 (e.g., the viewers whom the viewer/promoter 122 is promoting the video to). In one embodiment, the message can indicate that the viewer/promoter 122 invites the viewer 125 and the viewer 126 to watch a certain video. In another embodiment, the message can also include a link and/or a thumbnail to the video so that the viewer 125 and the viewer 126 can view the video by touching the link or the thumbnail. When the viewer 125 or the viewer 126 finishes watching the video, the system 110 can receive a message from the communication device 108 associated with the viewer 125 and/or the viewer 126 indicating that the viewer 125 and/or the viewer 126 have viewed the video.

In an embodiment, the system 110 can send a question or a series of questions to the communication devices 108 that are associated with the viewer 125 and/or the viewer 126. In response, the system 110 can receive a message from the communication devices that the viewer 125 and/or the viewer 126 have completed answering the questions about the video. The system 110 can then credit an account associated with the viewer 125 and/or the viewer 126 with a credit for having viewed the video and for answering the questions.

In another embodiment, the message sent by the system 110 to invite the viewer 125 and the viewer 126 to watch the video can also include a unique identifier (ID) that can identify the viewer/promoter 122. The system can associate the unique ID with the viewer/promoter 122 and can also associate the unique ID with the viewer 125 and the viewer 126 as viewers who have received an invitation from the viewer/promoter 122 to watch the video. In an embodiment, when the system 110 credits an account of a viewer for having watched a video and answering the questions associated with the video (e.g., viewer 125 or viewer 126), the system 110 can determine the appropriate promoter (e.g., viewer/promoter 122) based on the unique ID and then credit the account of the appropriate promoter (e.g., viewer/promoter 122) for having promoted a video to someone who has watched the video and has answered the associated questions (e.g., viewer 125 or viewer 126).

In an embodiment, the system 110 can further associate the unique ID that identifies the connection between the viewer/promoter 122 and the viewer 125 and the viewer 126 with the unique ID that identifies the connection between the promoter 121 and the viewer/promoter 122. Thus, the promoter 121 will receive a credit for promoting the video to the viewer 125 and the viewer 126 via the viewer/promoter 122.

In an embodiment, the system 110 can maintain a record indicating that a certain viewer has received a credit for watching a certain video and another record indicating that a certain promoter has received a credit for the certain viewer having watched the video, and the like. Such records can prevent a person from being credited multiple times for watching the video multiple times or for being credited multiple times for promoting the same video to the same people. The records can be stored in, for example, database 114 of the system 110, and can be accessed by the system prior to crediting the viewer and/or the promoter. For example, if the system 110 receives a message indicating that a certain viewer has viewed a certain video (and optionally has answered a series of questions), then the system can check the database 114 to determine whether the viewer has already been paid or credited for watching the video. If the records indicate that the viewer has already viewed the video and has already been paid or credited, then the system 110 can halt any further payments to the viewer for watching this same video. If the records indicate that the promoter has already been credited for promoting a video to a certain viewer, then the system 110 can halt any further payments to the promoter for promoting the video to the same viewer. If the records indicate that a promoter has already been credited for promoting a video to a certain viewer, then the system 110 can halt any further payments to a different promoter for promoting the video to the same viewer.

In an embodiment, the system 110 can be configured to implement a method in which a promoter 121 can be selected based on a competitive bid or an evaluation based on merit established by prior promotions, or a combination of both, in which the promoter 121 can agree to accept a transaction that can result in a disproportionally large payment amount but only if the promoter 121 achieves a predefined level of success. For example, the system 110 can display a message on the communication devices 108 that are associated with viewers and promoters, the message indicating that a certain video is available for a promoter to promote the video. The message can indicate a total number of viewers that are targeted to achieve by a certain date. In an embodiment, the message can indicate the starting bid (in terms of a monetary amount) for a promoter to promote a video and to achieve the total number of viewers to have viewed the video and optionally to have answered the questions associated with the video by a certain date. The message can invite the potential promoters to bid a lower amount than the starting bid for the right to promote the video to achieve the total number of viewers by the specified date. In an embodiment, the message can explain the terms of the agreement, for example, if the specified total number of viewers are been achieved by the certain date, then the promoter will not be paid the amount of the bid, or alternatively the promoter will be paid a lesser amount than the amount bid.

In response, the system 110 can receive bids from the potential promoters. In an embodiment, the system 110 can determine the promoter based on the lowest bid. In another embodiment, the system 110 can determine the promoter based on a rating of each of the potential promoters that submitted a bid. The rating can reflect the past success of the promoter. For example, the profile that is associated with each promoter can include a track record of the promoter's success at promoting videos. The profile of certain promoter (e.g., promoter "A") may indicate that this promoter has successfully promoted 400,000 views in 2 months; while the profile of another promoter (e.g., promoter "B") may indicate that this promoter has successfully promoted 200,000 views in 4 months; while the profile of promoter "C" may indicate that he or she has successfully promoted 100,000 views in 4 months. In this hypothetical case, the system 110 may assign a highest promoter rating to promoter "A" (e.g., 10 on a scale of 10); a middle rating to promoter "B" (e.g., 7 out of 10) and the lowest rating to promoter "C" (e.g., 4 out of 10).

In an embodiment, the system 110 can select the promoter based on a promoter having a combination of a low bid and a high rating. For example, a first bidder who placed a bid to promote a video for a higher price than a second bidder can still be selected if the first bidder has a higher rating than the second bidder.

In an embodiment, the system 110 can allocate a total budget for promoting a video between a promoter 121, one or several levels of viewer/promoters, and the viewers. In a hypothetical example, suppose a company has a $1,000,000 budget to reach 1,000,000 viewers, which can be divided, for example, as follows. The operator and or owner of the social media reward system can receive 20%, or $200,000. 50% of the remaining budget, or $400,000, can be credited to the viewers. Since there are 1,000,000 viewers, then each viewer can get 40 cents. The remaining $400,000 of the budget can be divided between the promoter and the users who recommended the video to other users. In addition, celebrity promoters can retain the entire promoter budget for promoting the video and thus be incentivized to use their status and social media contacts to reach the targeted audience. For example, If a promoter promotes the video to 400 Tier One users, and each Tier One user (400 total) promotes the video to 50 Tier Two users, and each Tier Two user (20,000 total) promotes the video to 50 viewers, such that 1 Million total viewers are reached (400×50×50), the remaining budget of $400,000 can be divided between the promoter, the Tier One users and the Tier Two users, for example, as follows.

The promoter 121 can be required to promote the video to a minimum number of users (in this example, 400 users). In an example, the promoter's total payment can be capped at 1% of the total allocation for the viewers ($400,000) or $4,000 for promoting the video if the number of viewers reaches 1,000,000 views. In an embodiment, if the promoter fails to achieve the target audience of 1,000,000 views, then the promoter may not get paid his or her commission. In an example, the remaining $396,000 can be divided between the Tier One users and the Tier Two users. If, for example, the remaining $396,000 is divided evenly between the Tier One users and the Tier Two users, then $198,000 can be allocated for the Tier One users and $198,000 can be allocated for the Tier Two users. In the event of a single, high profile promoter, that individual would be paid the full $396,000 for their promotional efforts.

In an embodiment, instead of creating a fraction of a percentage, each user gets a "Point" for recommending a video to a user below them. In the example, each of the 400 Tier One users recommended 50 users who each recommended 50 users. In other words, each of the 400 Tier One users has promoted the video to 2,500 viewers, which can correlate to 2,500 points for each of the 400 Tier One users. In this example, there are 1,000,000 total points that have been allocated to the Tier One users (400 Tier One users×2,500 points each). The system 110 can determine a monetary value for each point, in this case, $198,000/1,000,000 or $0.198 per point. Therefore, each Tier One user (who has each earned 2,500 points) can be credited with $495.00 (plus the 0.40 for viewing the video=$495.40).

In the example, each of the 20,000 Tier Two users recommended 50 users who viewed the video. In other words, each of the 20,000 Tier Two users has promoted the video to 50 viewers, which can correlate to 50 points for each of the 20,000 Tier Two users. In this example, there are 1,000,000 total points that have been allocated to the Tier Two users (20,000 Tier Two users×50 points each). The system 110 can determine a monetary value for each point, in this case, $198,000/1,000,000 or $0.198 per point. Therefore, each Tier Two user (who has each earned 50 points) can be credited with $9.90 (plus the 0.40 for viewing the video=$10.30).

Each of the Final Tier users for this example who did not promote the video can receive just their viewer payment of $0.40.

FIG. 2 illustrates a method 200 for targeting and rewarding a video promoter and a viewer related to social media advertising and for determining the promoter's and the viewer's remuneration for promoting and watching a video. In an embodiment, a system (e.g., system 110 including processing logic 116, as shown in FIG. 1) can be provided to implement the method 200. In block 202, a promoter can be identified based on an indication of a match between a profile associated with a video and a profile associated with the promoter. In block 204, a viewer associated with the promoter can be sent an invitation to view the video, wherein the invitation comprises a unique identifier configured to credit an account of the promoter and to credit an account of the viewer associated with the promoter when the viewer associated with the promoter has viewed the video.

In block 206, message indicating that the viewer associated with the promoter has viewed the video can be received by the system 110. In block 208, a message indicating that the viewer associated with the promoter has viewed the video can be received by the system 110. In block 210, the account of the viewer associated with the promoter who viewed the video can be credited, based on the message indicating that the at least one viewer associated with the promoter has viewed the video. In block 212, the account of the promoter can be credited, based on the message indicating that the at least one viewer has viewed the video. In an embodiment, an outstanding balance can be paid when the balance exceeds a minimum threshold, wherein the balance can be transferred to, for example, a bank account, a pay pal account, savings account or a check to an owner of the account.

Figure 3:
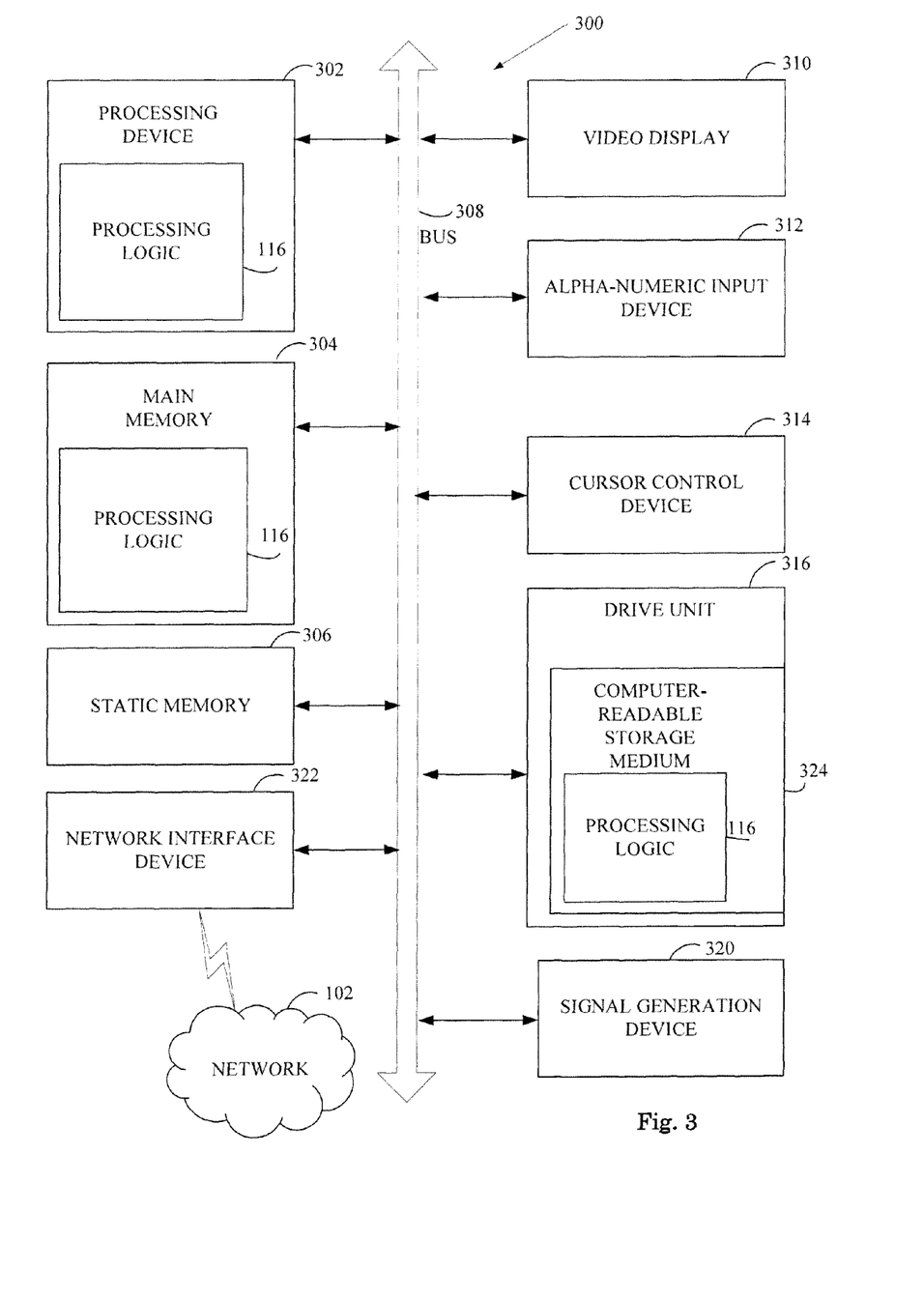
FIG. 3 is a block diagram of a computer system that may perform one or more of the operations described herein.

FIG. 3 illustrates a diagrammatic representation of a machine in the example form of a computer system 300 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processing device (processor) 302, a main memory 304 (e.g., read-only memory (ROM), flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a data storage device 318, which communicate with each other via a bus 308.

Processing device 302 represents one or more general-purpose processing devices such as a microprocessor, central processing unit, or the like. More particularly, the processing device 302 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 302 may also be one or more special-purpose processing devices such as an application specific integrated circuit (ASIC), a field programmable gate array (FPGA), a digital signal processor (DSP), network processor, or the like. The processing device 302 is configured to execute instructions 326 for performing the operations and steps discussed herein, illustrated in FIG. 3 by depicting instructions 326 within processing device 302.

The computer system 300 may further include a network interface device 322. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), and a signal generation device 320 (e.g., a speaker).

The data storage device 318 may include a computer-readable storage medium 324 on which is stored one or more sets of instructions or processing logic (e.g., "processing logic 116") embodying any one or more of the methodologies or functions described herein. The processing logic 116 may also reside, completely or at least partially, within the main memory 304 and/or within the processing device 302 during execution thereof by the computer system 300, the main memory 304 and the processing device 302 also constituting computer-readable storage media. The instructions for the processing logic 116 may further be transmitted or received over a network 102 via the network interface device 322.

While the computer-readable storage medium 324 is shown in an embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding, or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "sending", "receiving", "crediting", "determining", "generating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission, or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   identifying, by a processing device, a promoter based at least in part on:
   an indication of a match between a video profile comprising information about a video and a promoter profile comprising one or more preferences of the promoter, and
   a time period to achieve a certain plurality of total views of the video;
   in response to identifying the promoter, sending to the promoter, a message identifying the video and indicating that the video is available for promotion;
   sending, by the processing device, to a viewer associated with the promoter, an invitation to view the video, wherein the invitation comprises a unique identifier configured to credit an account of the promoter and to credit an account of the viewer when the viewer has viewed the video;

receiving, by the processing device, a message indicating that the viewer has viewed the video;

receiving, by the processing device, a message indicating that the viewer has answered a question regarding the video;

crediting, by the processing device, the account of the viewer who viewed the video, based on the message indicating that the viewer viewed the video; and crediting, by the processing device, the account of the promoter based on the message indicating that the viewer viewed the video.

2. The method of claim 1, further comprising:
receiving, by the processing device, a bid from a prospective promoter to promote the video; and
determining, by the processing device, the promoter based on the bid.

3. The method of claim 1, further comprising:
sending, by the processing device, to a second viewer associated with the viewer associated with the promoter, a second invitation to view the video;
receiving, by the processing device, a message indicating that the second viewer viewed the video; and
crediting, by the processing device, an account of the second viewer who viewed the video, based on the message indicating that the second viewer viewed the video.

4. The method of claim 3, further comprising:
crediting, by the processing device, the account of the viewer based on the message indicating that the second viewer viewed the video; and
crediting, by the processing device, the account of the promoter based on the message indicating that the second viewer viewed the video.

5. The method of claim 1, wherein identifying the promoter is further based on a monetary bid of the promoter.

6. The method of claim 1, wherein identifying the promoter is further based on a rating associated with the promoter.

7. The method of claim 1, wherein the information about the video of the video profile comprises at least one of a subject matter of the video, a genre of music performed in the video, a celebrity in the video, an target age group of the video, a target gender of the video, a target geographic location of the video, a medication featured in the video, a product featured in the video, or a hobby, political affiliation, or activity of a viewer.

8. The method of claim 1, wherein the one or more preferences of the promoter comprises at least one of an age of the promoter, a gender of the promoter, a geographic location of the promoter, a music preference of the promoter, a movie preference of the promoter, a product preference of the promoter, a medication taken by the promoter, or a hobby, political affiliation, or activity of the promoter.

9. The method of claim 1, wherein the video is a commercial video or a promotional video.

10. The method of claim 1, wherein the invitation comprises at least one of a hyperlink of the video or a thumbnail icon of the video.

11. The method of claim 1, further comprising promoting the video to the viewer based on a profile associated with the viewer.

12. The method of claim 1, further comprising determining a target audience size based on respective profiles of a plurality of viewers.

13. The method of claim 1, further comprising receiving a plurality of responses to one or more questions regarding the video from each viewer of a plurality of viewers after each viewer of the plurality of viewers has viewed the video.

14. The method of claim 13, further comprising:
generating a result by tabulating the responses of the viewers; and
sending the result to a device associated with an owner of the video.

15. The method of claim 1, wherein the viewer is credited a percentage of a promotional budget after receiving, from the viewer, a response to a series of questions regarding the video after the viewer has viewed the video.

16. The method of claim 1, further comprising crediting a viewer who promotes the video to other viewers a percentage of an amount allocated to each viewer for viewing the video and answering one or more questions regarding the video.

17. A system comprising:
a memory comprising instructions; and
a processing device operatively coupled to the memory, the processing device to execute the instructions to:
identify a promoter based at least in part on:
an indication of a match between a video profile comprising information about a video and a promoter profile comprising one or more preferences of the promoter, and
a time period to achieve a certain plurality of total views of the video,
in response to identifying the promoter, send to the promoter, a message identifying the video and indicating that the video is available for promotion;
send, to a viewer associated with the promoter, an invitation to view the video, wherein the invitation comprises a unique identifier configured to credit an account of the promoter and to credit an account of the viewer when the viewer has viewed the video,
receive a message indicating that the viewer viewed the video,
receive a message indicating that the viewer answered a question regarding the video,
credit the account of the viewer who viewed the video, based on the message indicating that the viewer viewed the video, and
credit the account of the promoter based on the message indicating that the viewer viewed the video.

18. The system of claim 17, further comprising:
receive a bid from the promoter to promote the video, wherein the promoter is identified based at least in part on the bid.

19. A non-transitory computer readable storage medium including instructions that, when executed by a processing device, cause the processing device to execute operations comprising:
identifying, by a processing device, a promoter based at least in part on:
an indication of a match between a video profile comprising information about a video and a promoter profile comprising one or more preferences of the promoter, and
a time period to achieve a certain plurality of total views of the video;
in response to identifying the promoter, sending to the promoter, a message identifying the video and indicating that the video is available for promotion;
sending, by the processing device, to a viewer associated with the promoter, an invitation to view the video, wherein the invitation comprises a unique identifier configured to credit an account of the promoter and to credit an account of the viewer when the viewer has viewed the video;

receiving, by the processing device, a message indicating that the viewer viewed the video;

receiving, by the processing device, a message indicating that the viewer answered a question regarding the video;

crediting, by the processing device, the account of the viewer who viewed the video, based on the message indicating that the viewer viewed the video;

crediting, by the processing device, the account of the promoter based on the message indicating that the viewer viewed the video; and paying, by the processing device, a balance, when the balance exceeds a minimum threshold, wherein the balance is transferred to at least one of a bank account, a pay pal account, savings account or a check to an owner of the account.

\* \* \* \* \*